W. JONES.
PURIFICATION OF SEWAGE AND ANALOGOUS LIQUIDS.
APPLICATION FILED OCT. 9, 1914.

1,247,540.

Patented Nov. 20, 1917.

W. JONES.
PURIFICATION OF SEWAGE AND ANALOGOUS LIQUIDS.
APPLICATION FILED OCT. 9, 1914.

1,247,540.

Patented Nov. 20, 1917.
6 SHEETS—SHEET 3.

W. JONES.
PURIFICATION OF SEWAGE AND ANALOGOUS LIQUIDS.
APPLICATION FILED OCT. 9, 1914.

1,247,540.

Patented Nov. 20, 1917.
6 SHEETS—SHEET 5.

W. JONES.
PURIFICATION OF SEWAGE AND ANALOGOUS LIQUIDS.
APPLICATION FILED OCT. 9, 1914.

1,247,540.

Patented Nov. 20, 1917.
6 SHEETS—SHEET 6.

Witnesses

Inventor
W. Jones.
By Jno. Imirie
Atty.

UNITED STATES PATENT OFFICE.

WALTER JONES, OF AMBLECOTE, STOURBRIDGE, ENGLAND.

PURIFICATION OF SEWAGE AND ANALOGOUS LIQUIDS.

1,247,540. Specification of Letters Patent. Patented Nov. 20, 1917.

Application filed October 9, 1914. Serial No. 865,890.

*To all whom it may concern:*

Be it known that I, WALTER JONES, a subject of the King of England, residing at Amblecote, Stourbridge, in the county of Worcester, England, have invented new and useful Improvements in or Connected with the Purification of Sewage and Analogous Liquids, of which the following is a specification.

This invention has reference to systems of purification of sewage and analogous impure liquids, in which the purification is effected by the action of aerobic bacteria, or other similar forms of germ life upon the sewage or liquid, and air is introduced into and passed through the sewage or liquid; and it has primarily for its object to provide improvements, whereby sewage and analogous liquids, can be better or more effectively and completely purified, and a large quantity of sewage or foul liquid can be treated and purified within a relatively short time; and also to accomplish these ends with economy of air and power, and inexpensive plant.

In sewage and analogous impure liquids containing bacteria or germ life, the bacteria or germ life is associated wholly or to a large extent with the solid matters which are contained in or carried by the impure liquid; and these solids, with their contained bacteria or germ life, tend to coalesce, and this coalescing is inimical to uniform and rapid treatment of the liquid contents of a tank in which the liquid is being treated and purified, and renders the quantity of sewage or liquid capable of being purified in a given time, relatively small. By and according to this invention, complete or effective treatment and purification is rapid, and large quantities of sewage can be purified within a relatively short time, and with simple and comparatively small and inexpensive tanks and plant, so that sewage of large towns, the volume of which is very great, can by this invention be purified completely and very economically, the effluent discharged being perfectly innocuous and a pure water; and this is accomplished by continuously, or repeatedly at short intervals, supplying the solid matters and liquid, and their contained bacteria, with diffused fresh air (produced as hereafter described) locally at the lower part of the liquid, and causing it in very small bubbles to rise thereby locally, and causing the liquid to return and fall down locally in the tank separate or away from the rising volume of liquid and its contained solids and bacteria, and to again pass to the locality of diffused air supply; so that the bacteria are continuously refreshed with air in a condition which renders them very active, and the solids with which they are associated are continuously distributed and diffused throughout the liquid, and the whole contents are also continuously kept in circulation by the air.

Furthermore, in some cases, where the sewage or analogous liquid is caused to flow through the tank, while being treated or purified, it is subjected to a plurality of successive increments of infusions of minute bubbles of air, produced by forcing it through a body having pores through it, in the bottom of the tank or vessel, and spaced apart so that the body of liquid receives successive increments of fresh air in the form of minute globules, in successive stages of passage through the tank or vessel.

The invention will be further described with reference to the drawings which illustrate it.

Figure 1:
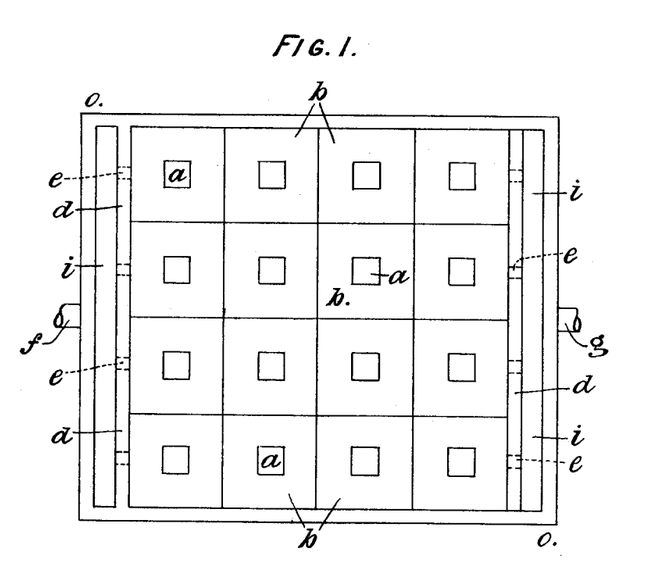
Figures 1 and 2 are plan and longitudinal section respectively showing a construction of tank according to the invention.
Figure 2:
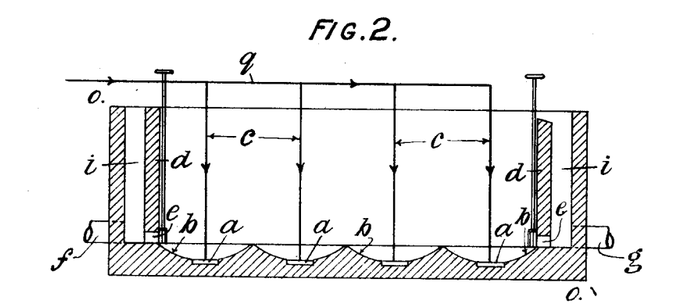

Referring to Figs. 1 and 2, in the apparatus there shown, there are a plurality of air diffusers consisting of bodies *a* of porous material, or having pores through them, through which compressed air is passed, and by which it is diffused; and these diffusers are arranged with a considerable distance between them, and in the inclined or curved bottom *b* of the tank *o*, so that the diffused air rising from them causes the liquid directly above them to be charged with minute globules of air, as to render it lighter, so that the column of air charged liquid rises, while the space in the tank above the bottom lying vertically between the diffusers or around them, provides a space or spaces through which the heavier liquid, ridded of the air particles on the surface, falls down. The bottom $b$ of the tank is curved or inclined downward as stated from a point between the several diffusers up to them, so that the deposited solids falling to the bottom of the tank, between the diffusers $a$, is caused by the inclined bottom—whether of a straight incline or curved—and the down or return flow of liquid to pass under the influence of the air rising from the diffusers, so that it is again lifted up, and kept continually circulating and distributing throughout the liquid in the tank all the time; and so that the bacteria shall always be being refreshed with the air and be kept in a very active state, while the solids and the bacteria which are associated with them will thereby be distributed, so that such bacteria are continually being redistributed, throughout the entire mass and every part of the liquid, and so that every part of it is being actively attacked by the bacteria, and the whole is thereby being equally and rapidly transformed to a purified condition.

In the tank $o$ as shown, there is not only a plurality of these diffuser bodies $a$ in the bottom $b$ in series, from the inlet to the outlet ends of the tank, but there is also a plurality of the series of diffusers in series, in parallel; and in the case shown and described, each of the porous bodies $a$ occupies practically a central position of an area and space of purifying action, and the bottom $b$ of each of such areas or spaces is inclined or curved downward toward the diffusers $a$ from ridges or higher parts, as shown.

Instead of the bottom being inclined in four directions, it may be inclined in two directions, so that the bottom as a whole would be channeled as it were, instead of cupped.

The sewage or like liquid enters the tank through a pipe $f$ into a narrow well or chamber $i$ between the inner wall $d$ and the main tank wall, in the bottom of which apertures $e$ are provided opposite each of the different series of porous bodies $a$; while on the discharge side a similar inner wall $d$ is provided, having apertures $e$ in it at the lower part; and this latter wall $d$ is lower than the main containing walls of the tank, so that the discharge of purified fluid can take place over it into the discharge well $i$. When desired the tank may be discharged through the lower outlet apertures $e$, these apertures being preferably provided with suitable controlling valves for this purpose, so that the liquid may be either discharged through the apertures or over the top of the wall. The purified liquid leaves the discharge well $i$ through the pipe $g$.

The diffuser bodies $a$ may be set over chambers in the bottom of the tank, or in boxes therein in any suitable way; and compressed air will be supplied to the chambers beneath them through pipes $c$, which in the drawings (Figs. 1 and 2) are shown diagrammatically extending down from above the tank; but they may be led to these spaces under the diffusers $a$ in any suitable way.

If the tank is continuously fed with sewage or like bacteria containing liquid, the purified liquid will be drawn off from the top of the tank as just described; and the same mode of drawing off of purified liquid will be used if the tank is filled up, and then the supply stopped, and when the liquid is purified, a certain proportion—more or less—is drawn off from it; and, as will be obvious, this drawing off of the liquid from the top should be as quietly done as possible.

In the case of continuous feed and discharge, the supply of compressed air will not, in most cases, be stopped; but it may be, if desired, periodically; but when the purification discharge of liquid takes place in batches, it will be stopped during the discharge.

In the case when supply of compressed air is periodically stopped for the purpose specified, a period of rest may be given to allow the solids and bacteria to precipitate, so that only that liquid will be run off which does not contain such solids. Afterward the tank will be immediately filled up and aeration will recommence at once.

Figure 3:
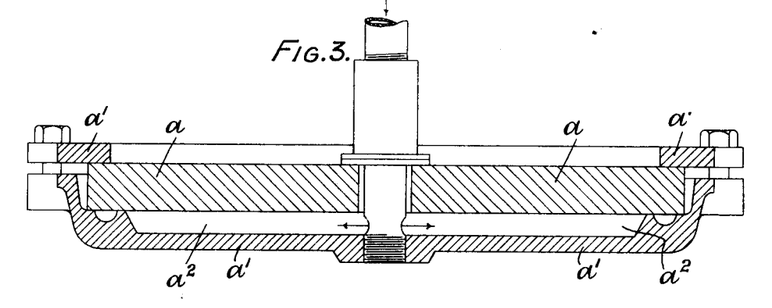
Figs. 3 and 4 are vertical section and part plan of the means of diffusing the air; that is, breaking it up and delivering it to the liquid in a large number of minute globules, and which for convenience are termed hereafter "diffusers"
Figure 4:
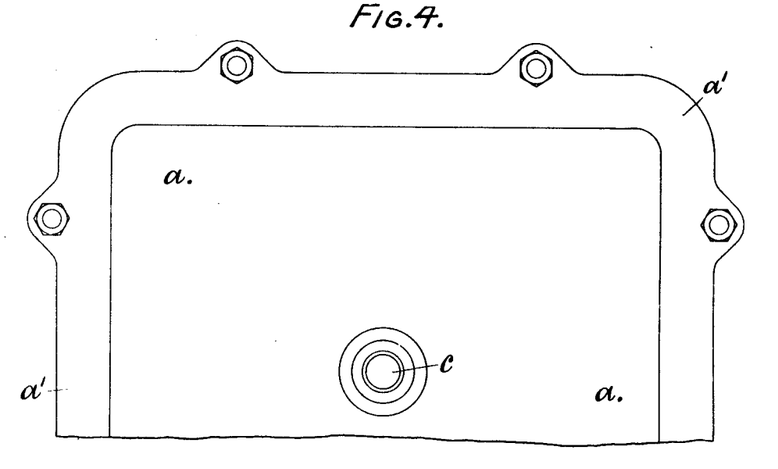
Figure 5:
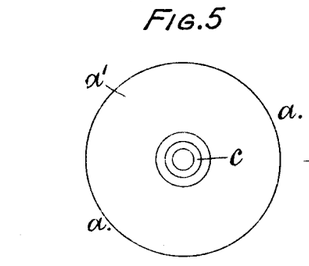
Figs. 5 and 6 are end view and longitudinal section of a modified form of diffuser.
Figure 6:
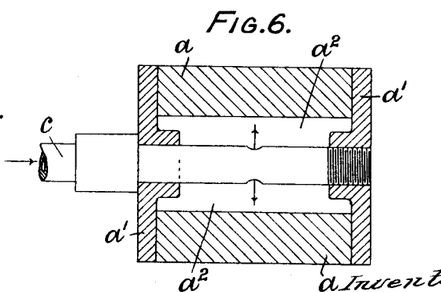

In Figs. 3 to 6 the diffusers $a$ are porous slabs, preferably natural or artificial porous stoneware, (although any material which is porous, or has pores through it, and analogous as to the effect produced, may be used), held in metal frames or parts $a^1$ consisting of two parts held together by screws, bolts or the like. In Figs. 3 and 4 the body $a$ is flat; and in Figs. 5 and 6 it is cylindrical, and the air to which is conducted by the pipe $c$ from the compressing plant or means into the space $a^2$ under or within the body $a$.

Figure 7:
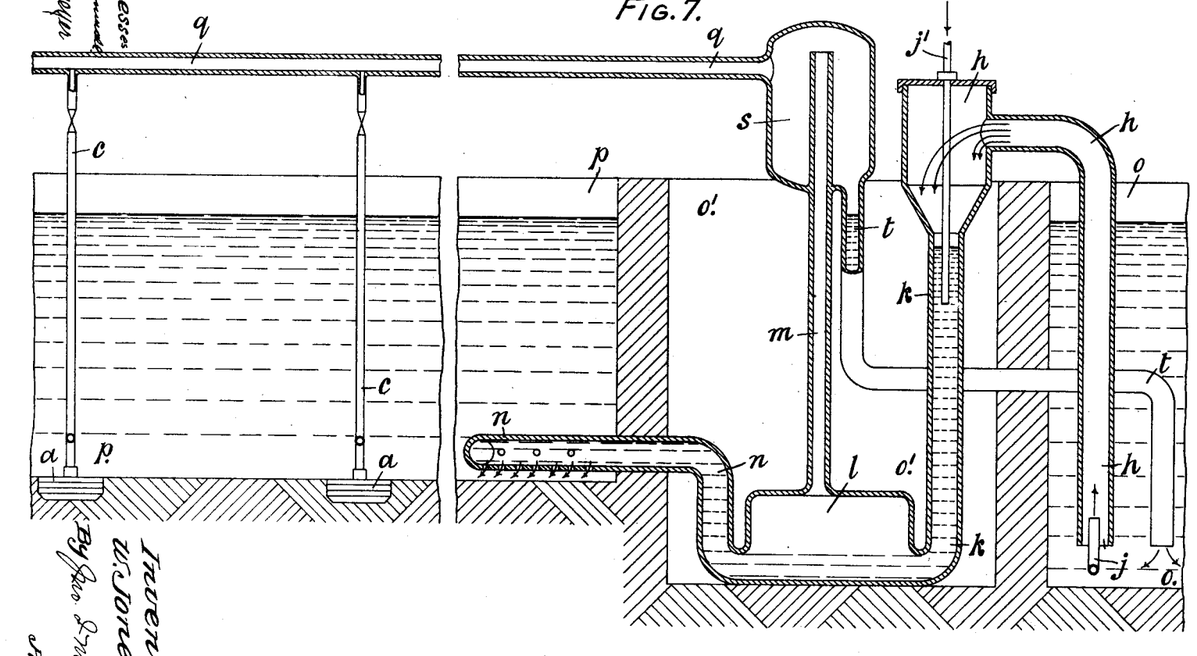
Figs. 7 and 8 are longitudinal elevation in section, and plan, and showing a modified general arrangement of tanks and parts of apparatus according to the invention.
Figure 8:
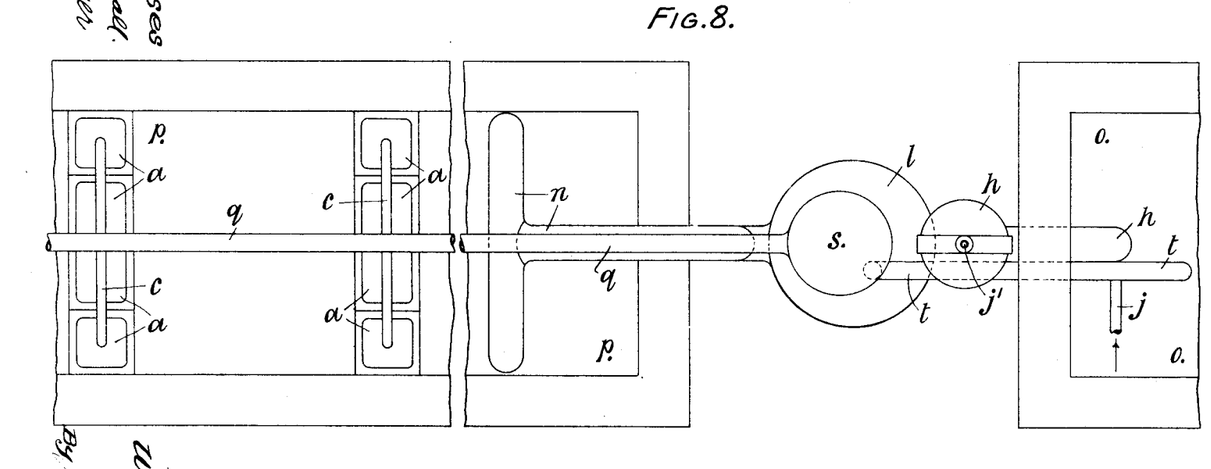
Figure 9:
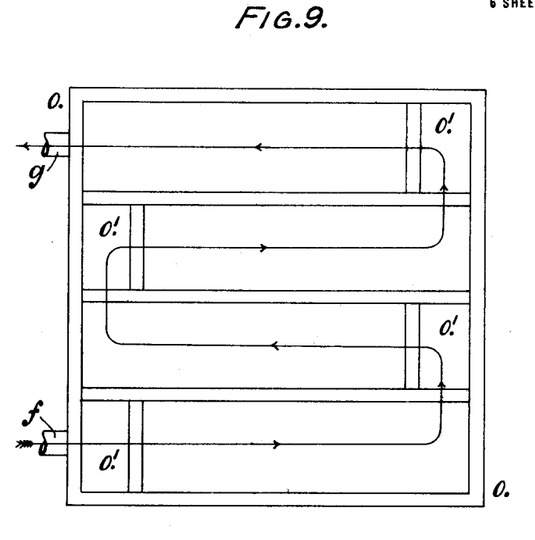
Figs. 9, 10, 11 and 12 show other modified forms of tanks which may be employed in carrying out the invention.

In the arrangement shown in Figs. 7 and 8 two tanks or compartments $o$, forming parts of the plant are shown, from and to which the liquid is forced, and through which it is circulated, by pneumatic forcing and aerating means.

This liquid forcing and circulating apparatus, comprises a pipe $h$ ascending from near the bottom of one tank $o$, into the lower open end of which compressed air is forced through a pipe $j$; and a downtake pipe $k$ joined to the pipe $h$ and into the upper end of which the liquid and air is discharged; the upper end $h$ of the pipe being in the form of a funnel, and having extending down through it, an air introducing pipe $j^1$. The combined volume of air and liquid passing down the pipe $k$ passes through a bell-shaped or foot chamber $l$, wherein a part of the air separates from the liquid, and the liquid is passed on by a pipe $n$ into the other tank $p$; while the separated air, under compression, passes up from the foot chamber $l$ by a pipe $m$ into a chamber $s$, and thence by a pipe $q$ into the several compressed air supply pipes $c$, which are connected with and conduct the air to the various diffuser blocks $a$ in the bottom of this tank $o$, and of which there are a plurality in series.

The liquid and the air it contains, is conducted from the foot chamber $l$ into the inlet end of the tank $o$ by a pipe $n$, which is branched and perforated as indicated in the drawing; and any liquid which rises with the separated air up the pipe $m$ into the vessel $s$ separates itself from the air there, and passes back by a pipe $t$ from the bottom of this vessel, back into the first tank $o$.

In action then, sewage or like impure liquid is first forced up and aerated by the compressed air passing from the pipe $j$, and then further air is introduced into the liquid by the pipe $j^1$ by induction, produced by the flow of liquid past the end of this pipe, which dips down into the liquid in the pipe $k$.

This mixing and addition of the air with the liquid, constitutes the first or preliminary stage of super-saturation of the liquid with the oxygen. Nevertheless a large proportion of the air separates itself from the liquid in the foot chamber $l$; while the remainder passes along with the liquid and passes into the liquid in the second tank $o$, into which this preliminary aerated liquid is introduced; while the other compressed air in bulk passes to the diffusers $a$.

Thus the liquid in passing through this tank $o$ which has any number of diffusers $a$ in it, is subjected to repeated aerations or increments of diffused fresh air in succession.

The diffusers are arranged in this, as in all cases, with a considerable distance between them, and in the bottoms of the tanks or compartments, so that the diffused air rising from them, causes the liquid directly above them to be charged with diffused air, and to rise, while the space in the tank above the bottom, between the diffusers provides a space through which the heavier liquid, ridded of the air particles at the surface, falls down, and passes again over the diffusers area and is aerated, and the same effect takes place; so that the solids and bacteria tending to coalesce are prevented from so doing, but are always being distributed and diffused throughout the liquid; and therefore their purifying action on every part of the liquid throughout, and in uniform and rapid manner, is assured; and, thus in a tank of such sizes as are used in sewage works, all the particles of solid matter and bacteria, the particles of air, and the particles of liquid, are kept in the most intimate contact, and there is no portion of the contents of the tank, viz., the liquid, the bacteria containing solids, and the gaseous, that is not either active, or being actively operated upon; and the rate of purification is rendered relatively extremely rapid.

Further, in the case where there is a continuous flow through the treating tank or compartments, there will also in addition to the several up and down circulating bodies of liquid, also be a horizontal circulation.

When a certain amount of liquid is delivered into a tank or tanks to be treated, it may then be circulated around and around, or through various tanks or compartments, and back again, according to the form of tank, and the liquid and solid containing the bacteria are subjected to the successive additions and actions of fresh air from the diffusers $a$; and up and down circulations created thereby; and when it has been sufficiently treated, may be drawn off from the tank or tanks through the drawing off pipe $g$ which is on the tank system, and fresh liquid introduced through the inlet pipe $f$.

In some cases, the air pipe $j^1$ of the lifting and preliminary aerating apparatus may be dispensed with, and the only air introduced into the liquid in the forcing apparatus, is that forced in through this pipe $j$.

Figure 10:
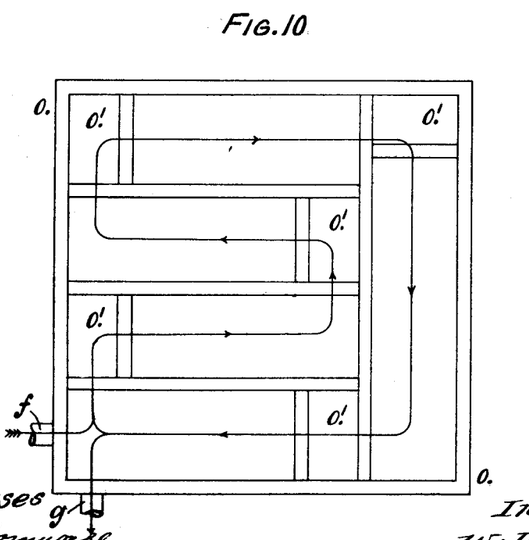
Figure 11:
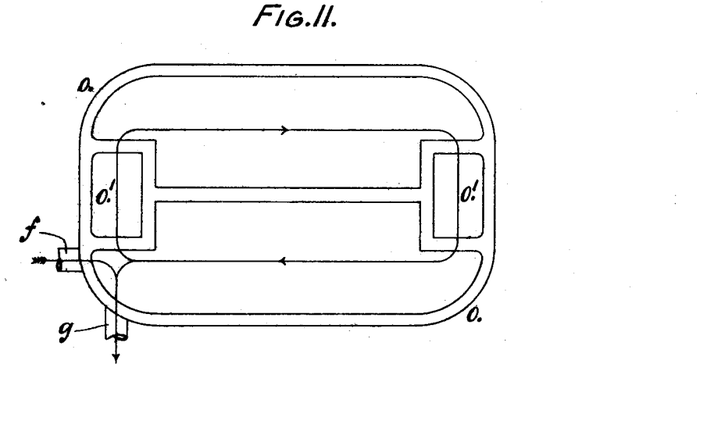
Figure 12:
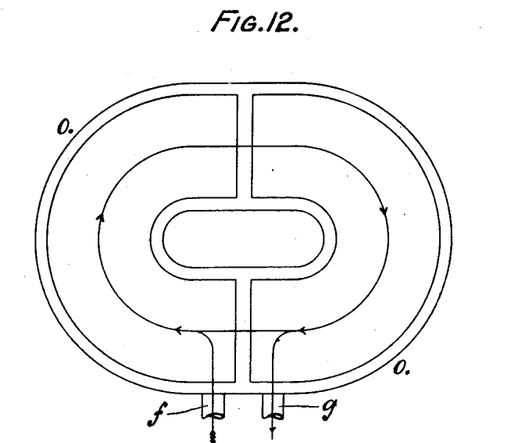

It is obvious, that the process of circulation may be repeated indefinitely, as indicated by the continuous arrow lines in Figs. 10, 11 and 12; or the liquid may be drawn off after one circulation of the tank channels, as indicated by the terminals on the arrow lines through the discharge pipes $g$.

It will be understood that the various pipes and conduits will have suitable valves or sluices connected with them by which the supply, discharge, and flow of liquid to and from the apparatus, and between the different parts, may take place; and also, it will be understood that in the spaces $o^1$ in the various tanks the aerating and lifting apparatus by which the liquid is lifted from one vessel into another, or from one compartment into another, is fitted.

In the tanks shown in Figs. 7, 8, 9, 10, 11 and 12, the diffusers $a$ will be presumed to be extended completely across the tanks or channels $o$, and in the floor of same.

As a modification of the arrangement shown in Figs. 7 and 8, the means for forcing the liquid from one tank consisting of a rising pipe $h$ and a descending pipe $k$, may be employed for the purpose of forcing the liquid and producing the preliminary or partial aeration of the liquid; and the air to be delivered into the liquid subsequently by the diffusers, may be separately provided or supplied, instead of in the manner as set forth with reference to Figs. 7 and 8, where there is only one common supply of air for the whole system.

When the liquid is to be forced from one tank or compartment to another, instead of air forcing means being employed, it may be effected by rotary or other pumps.

What is claimed is:—

1. The process of treating sewage and the like consisting in causing a local upflow in the liquid and supplying air locally into the liquid in its flow, and permitting the liquid to flow downward to another point.

2. The process of treating sewage and the like, consisting in causing a local upflow in the liquid, supplying air into the liquid in its upflow, and causing this liquid and the sludge or solid matters contained in it to flow to a point of the part of the flow which is being supplied with air.

3. The process of treating sewage and the like, consisting in causing a local upflow in the liquid, and supplying air locally into the liquid in its flow, causing the sludge or solid matters to pass to a point of the part of the flow which is being supplied with air, and removing the clarified liquid from the body.

4. The process of treating sewage and the like, consisting in causing an up and down flow, and a lateral flow in the liquid, and supplying air into the liquid in its flow.

5. The process of treating sewage and the like, consisting in causing an up and down flow, and a lateral flow in the liquid, the lateral flow being from the upper part of the liquid, and supplying air into the liquid in its flow.

6. The process of treating sewage and the like, consisting in causing an up and down flow, and a lateral flow in the liquid, the lateral flow being from the upper part of the upflowing part of the liquid, and returning the liquid to the lower part of the upflow part, and supplying air into the liquid in its flow.

7. The process of treating sewage and the like, consisting in causing an up and down flow, and a lateral flow in the liquid, and returning the sludge to the upflow.

8. The process of treating sewage and the like, which consists in delivering air into the mass of sewage locally, causing local rising of a portion of the sewage, and permitting the sewage to pass to a second local point laterally spaced from the rising column.

9. The process of treating sewage and the like, subjecting the liquid to a plurality of successive increments of air, causing the liquid to flow laterally, and in its flow receive such increments of air.

10. The process of treating sewage and the like, which consists in introducing air locally into the mass of liquid, and thereby setting up an upcurrent in the sewage over the air supply locality, and then permitting the sewage to flow outward from the upper part of the upcurrent, and descend and flow into the path of the upcurrent.

11. The process of treating sewage and the like, which consists in introducing air locally into the mass of liquid at a plurality of points, and thereby setting up upcurrents in the sewage over the air supply localities, and permitting the sewage to flow outward from the upper part of one of the upcurrents, and descend and flow into the path of another upcurrent.

12. The process of treating sewage and analogous liquids, which consists in supplying air under pressure into the liquid whereby to effect an intimate mixture of the air with such sewage, and thereby providing in that portion of the sewage wherewith the air is mixed a relatively light column of combined air and sewage, whereby circulation of the sewage is established.

13. The process of treating sewage and the like, consisting in delivering locally to the lower portion of a mass of sewage a plurality of successive increments of infusions of minute bubbles of air; causing the sewage at the points of delivery of increments of air to rise by the infusion of air therewith; and causing the sewage freed of the air to fall and come under the influence of succeeding increments of air.

14. The process of treating sewage or the like, consisting in forcing air into sewage to be delivered to a mass of sewage for treatment; delivering the sewage and its contained air into the said mass of sewage to be treated, by the air forced into the sewage; and subsequently subjecting the mass of sewage to the action of infusions of minute bubbles of air introduced at the lower portion of the mass.

15. The process of treating sewage and the like, consisting in forcing air into sewage to be delivered to a mass of sewage for treatment; delivering the sewage and its contained air into the said mass of sewage by the air forced into it; separating from the sewage being delivered to the mass of sewage some of the air contained therein; and subsequently diffusing the separated air locally into the lower portion of the mass of sewage and aerating it.

16. The process of treating sewage and the like, consisting in forcing air into sewage to be delivered to a mass of sewage for treatment; delivering the sewage and its contained air into the said mass of sewage by the air forced into it; separating from the sewage being delivered to the mass of sewage some of the air contained therein; subsequently diffusing the separated air locally into the lower portion of the mass of sewage and aerating it; supplying fresh air to the lower portion of the mass of sewage; diffusing it locally into the said mass; and aerating the mass locally to obtain up and down currents in the mass.

In testimony whereof I have signed my name to this specification in the presence of two subscribing witnesses.

WALTER JONES.

Witnesses:
STELLA BENSON,
ERNEST HARPER.